Oct. 19, 1948.  M. BLAU  2,451,908
METHOD AND APPARATUS FOR DETECTING
CHANGES IN DIMENSIONS
Filed March 7, 1946
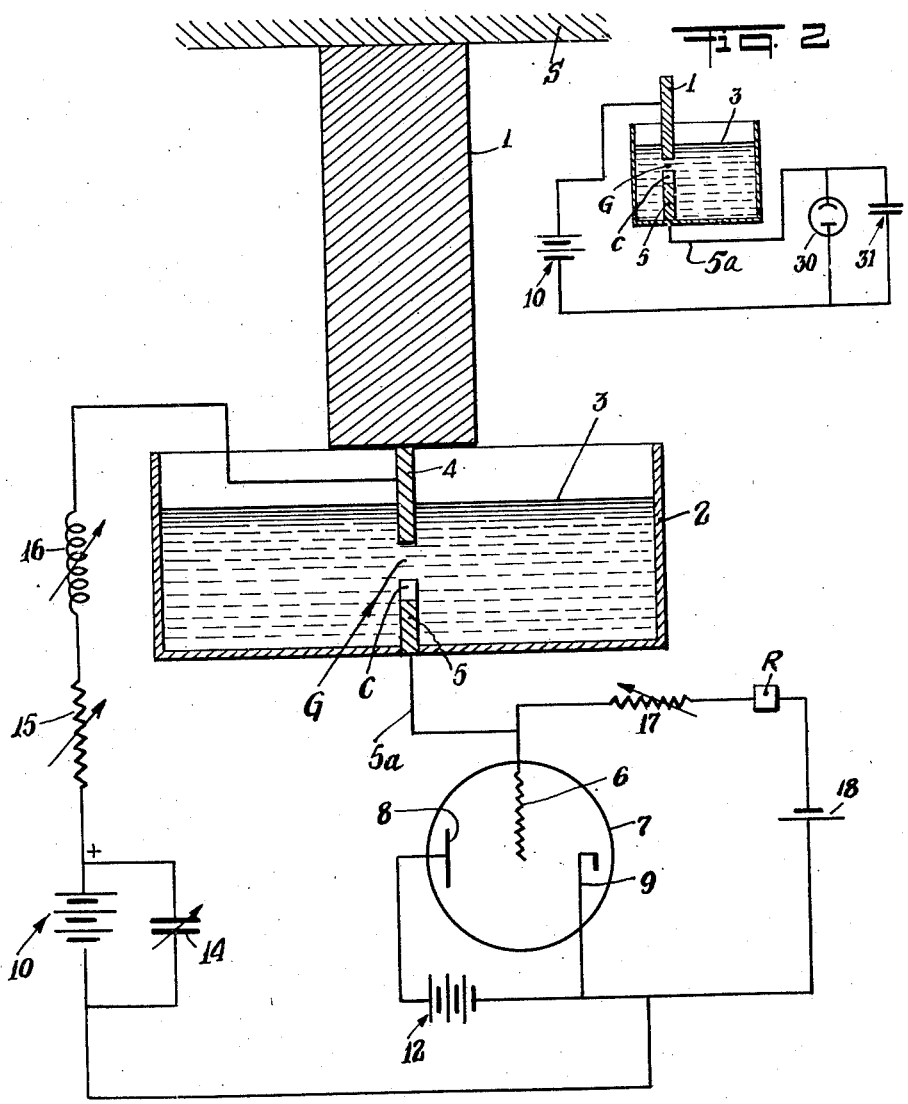
INVENTOR.
Marietta Blau
BY Max Blum
ATTORNEYS Patented Oct. 19, 1948

2,451,908

UNITED STATES PATENT OFFICE 2,451,908

METHOD AND APPARATUS FOR DETECTING CHANGES IN DIMENSIONS

Marietta Blau, New York, N. Y., assignor to Canadian Radium and Uranium Corporation, New York, N. Y., a corporation of New York Application March 7, 1946, Serial No. 652,773

4 Claims. (Cl. 250—83.6)

My invention relates to a new and improved method and apparatus for detecting and measuring the change in dimension in a test body which is produced by a change in temperature, pressure, torsion, magneto-striction, and any other force. The test body may be made of any material, electrically conductive or non-conductive, and said body may have any shape. It may be a cylindrical rod, a spiral or helical coil, etc.

For example, if the change in dimension results from a change in temperature, the method and apparatus can be used for determining the unknown coefficient of linear expansion of the material of the test body, or for determining the unknown length or other dimension of a test body, whose coefficient of linear expansion is known.

The change in dimension may be used to start or cut off or vary or modulate an ionization current or leakage current through an ionizable dielectric which is preferably freely yieldable under mechanical force. This ionization current can be detected or amplified by known means, so that the amplified ionization current can be used to control or to operate a switch or any other electrically operated device or electronic device or electrical discharge device.

The new method and apparatus can thus be used to detect and to measure changes in temperature, pressure, torsion, changes in magnetic and electrostatic fields, etc., which may be very slight. The method and apparatus can thus be used in signaling and control systems.

As one example, the test body may be a cylindrical metal rod, which is used as one terminal or electrode of the gap through which the ionization current is sent. The other electrode of the gap may be a cylindrical rod or wire of known length and made of a material of known coefficient of linear expansion. The gap is filled with the ionizable dielectric, which is optionally a liquid, although the invention is not limited to the use of a liquid dielectric. As an example, the dielectric may be the liquid mixture which is designated as xylol or commercial xylene. This is a mixture of ortho, meta, and para xylene, and it is a well-known solvent for rubber cement, lacquers, varnishes, etc. It has very low conductivity. The liquid dielectric in this gap is ionized by any ionizing means, such as a standard radium cell or polonium cell. The electrodes are preferably longitudinally alined, so that they have a common longitudinal axis. The electrodes are respectively connected to the respective terminals of a source of electric current, which may be a battery or other source which impresses a constant and unidirectional potential upon the electrodes. The invention is not limited to the use of such a constant or a unidirectional source of potential.

If the impressed voltage is constant and unidirectional, the amperage of the ionization current depends wholly upon the length of the gap, if the intensity of ionization is maintained constant, which is preferred.

An important feature of the invention is to use a non-gaseous ionizable dielectric, in which the emitted and ionizing alpha particles have a short ionizing range. The maximum ionization range is preferably 50–60 microns. As an example, the ionizing range of alpha particles which are emitted by radium or radon or polonium, is in the order of thirty microns, if xylol is used as the dielectric. The cell or the mass of radio-active material is located at or close to the tip of one of the electrodes, so that the ionization of the dielectric in the gap is uniform and constant. The cell or mass may be mounted upon the tip of one of the electrodes, or the cell or the mass of radio-active material which emits the ionizing alpha particles may be embedded in the tip of one of the electrodes, or it may be held by an independent support close to the tip of one of the electrodes so as to ionize the dielectric in the gap.

In such case, if the length of the gap exceeds the very short ionizing range, no ionization current through the dielectric is produced. If the length of the gap is diminished to the ionization range by an increase in length of the test body, as by an increase in temperature which increases the length of the test body, the ionization current will start, and a further increase in the length of the test body will result in an increase of the ionization current. By using an ionizable dielectric in which the ionization range of the alpha particles is short, a change in length of the test body which is as small as two microns or less, can be readily detected and measured.

Likewise, if the positions of the electrodes are initially adjusted so that the initial length of the gap is substantially equal to the ionization range, a very small decrease in the length of the test body, in the order of two microns or less, can be readily detected, because the ionization current will be reduced to zero.

The initial length of the gap can be adjusted so that an ionization current will always flow, and the amperage of the ionization current will thus be regulated by the increase and decrease in length of the test body, which will decrease and increase the length of the gap.

The impressed constant voltage which is applied to the electrodes, or the maximum value of a variable impressed voltage which is thus applied, can be regulated, so as to control the amperage of the ionization current.

If the dielectric is air or a gas, such minute effects cannot be detected or measured, or they cannot be accurately detected or measured, even with the use of an amplifying system.

Thus, under standard conditions, namely, a pressure of 670 millimeters of mercury and a temperature of 15° C., the ionizing range in air of alpha particles which are emitted from radium and radon and polonium, is in the range of 3–4 centimeters, or 30,000 to 40,000 microns. In such case, a change in the length of the gap in the order of two microns, cannot be detected or measured, or at least, such detection and measurement cannot be reliably or accurately determined or measured.

As examples of other mechanically yieldable and non-gaseous and ionizable dielectrics which I can use, I refer to anhydrous ethanol, ether, carbon disulphide, benzene, pure water, photogelatin, etc. It is sufficient if the selected ionizable dielectric is sufficiently mechanically yieldable to permit a detectable change in dimension of the test body.

Other objects and advantages are disclosed in the annexed description and diagrammatic drawings, which illustrate a preferred embodiment.

Fig. 1 illustrates the use of the ionization current, to regulate the grid voltage of a detector or amplifier.

Fig. 2 illustrates the use of the variable-resistance gap through the dielectric, in a relaxation oscillator.

In this example, the test body is a cylindrical metal rod 1, whose longitudinal axis is vertical. This rod has top and bottom planar walls. A vertical axial electrode 4 is fixed to the bottom face of rod 1. Electrode 4 may be a cylindrical metal wire or rod, whose diameter is 5 millimeters. The top face of rod 1 is fixed to any suitable and vertically adjustable support S. The bottom electrode 5 may be a cylindrical metal wire or rod, whose diameter is 5 millimeters. The electrodes 4 and 5 are of known length, and their materials are of known coefficients of linear expansion, in order to make a known allowance for any change in their lengths, due to a change in temperature. The bottom of electrode 5 is fixed to the horizontal bottom wall of tank 2, which may be made of conductive or non-conductive material, non-conductive material being preferred. If said material is non-conductive, said electrode 5 extends through said bottom wall. The tank 2 is filled with xylol, up to the horizontal level 3. A cell C, which may be a standard radium or polonium cell, is fixed to the top of bottom electrode 5. The rod 1 and the electrodes 4 and 5 preferably have a common vertical longitudinal axis. The cell C may produce radon, which escapes through the wall of the cell into the gap G, which is filled with the xylol.

As previously noted, the cell or the mass of radio-active material may be embedded in the tip of electrode 4 or of electrode 5. The cell or the mass of radio-active material may be supported independently of the electrodes 4 and 5, in such position as to ionize the xylol in gap G. Said ionization is preferably uniform and constant.

The purpose of using the electrodes 4 and 5 is to provide a small and known capacitance at the separated tips of the electrodes 4 and 5, at the ends of the gap G. The electrode 4 may be omitted if the rod 1 is conductive and the bottom portion of rod 1 may then be immersed in the xylol, so that the rod 1 is one of the electrodes.

The bottom end of electrode 5 is connected by wire 5a to the grid 6 of a highly evacuated triode 7, which has an anode or plate 8, and a cathode 9, which may be of the heater-cathode type. The triode 7 conventionally illustrates a detecting or amplifying system, which may have one or more stages.

The positive terminal of battery 10, which delivers a constant and unidirectional current, is connected to electrode 4. The negative terminal of battery 10 is connected to cathode 9.

The battery 10 serves as a C-battery to provide a biasing voltage for the control-grid 6. The triode 7 is provided with the usual B-battery 12 or other plate-voltage source, which supplies a constant voltage between anode 8 and cathode 9. This voltage can be regulated in any suitable manner.

The negative terminal of battery 10 may be connected to test rod 1, in which case, the positive terminal of battery 10 is connected to cathode 9. The gap-circuit includes an adjustable resistor 15 and an adjustable inductor 16. An adjustable capacitance 14 may be connected in shunt to battery 10.

The grid 6 and cathode 9 may optionally have any supplemental biasing battery or other biasing means, in order to impress any desired negative or positive voltage on the grid 6, relative to cathode 9.

In the illustrated embodiment, when the gap G is non-ionized and the ionization current is zero, the impressed voltage of grid 6 is zero, and some space current will flow through the triode 7. By regulating the grid voltage independently of the ionization current, this triode space current may have any initial value.

If the battery 10 is used, the triode current is accurately measured while the ionization current is zero. The height of gap G is adjusted, until an ionization current is produced through gap G.

This will produce a difference in voltage between grid 6 and cathode 9. If the resistance of resistor 15 is zero, the impressed voltage upon the grid will depend upon the ratio of the resistance of gap G and the resistance in the space of triode 7 between grid 6 and cathode 9. A positive or negative voltage is thus impressed upon grid 7 during the flow of the ionization current. The resistance of gap G is in the order of 1000 megohms.

I can optionally use a C-bias battery 18. In the drawing, the positive terminal of battery 18 is connected to the cathode 9, and its negative terminal is connected to the input grid 6 through a rectifier R and an adjustable resistor 17. When the ionization current through gap G is zero, a constant negative bias is thus applied to grid 6. The connections of battery 18 may be reversed, with a corresponding reversal of rectifier R, so that battery 18 will impress a selected positive bias upon grid 6, when the ionization current is zero.

If a negative bias is imposed upon grid 6 by battery 18, this is preferably too low to cut off the plate current in the tube 7, when the ionization current is zero.

As an example, it is assumed that battery 18 impresses a negative bias upon grid 6, and that the positive terminal of battery 10 is connected to electrode 4. In such case, the rectifier R may be omitted. In such case, the ionization current may be equal to or greater than or less than the grid-cathode current of battery 18. It is clear that the flow of ionization current will regulate the bias of grid 6.

If the positive terminal of battery 18 is connected to the grid 6, the rectifier R may be used, in order to prevent the ionization current from being by-passed through battery 18, if the voltage of the battery 10 exceeds the voltage of battery 18. As one example, the voltage of battery 10 may be 500 volts, which may greatly exceed the voltage of battery 18.

When I refer to the connection of the test body 1 to one of the electrodes, I include the case in which the test body 1 is used directly as one of the electrodes.

If I use a multi-grid amplifier, the respective electrode is connected to the injection grid.

I optionally use a class A amplifier, in which the plate current in the triode 7 flows at all times, and in which the grid bias is adjusted so that the amplification has a straight-line characteristic.

When the temperature of rod 1 is increased, the length of rod 1 is increased, the length of gap G and its resistance are decreased, thus increasing the respective negative or positive bias upon grid 6, so that the plate current in triode 7 is correspondingly regulated. Due correction can be made for the elongation or contraction of the electrodes 4 and 5 which results from the change in temperature. Said electrodes 4 and 5 can be made of the same material, which may or may not be the same as the material of rod 1. The electrodes 4 and 5 can be made very short in comparison to the length of rod 1, so that the expansion and contraction of the electrodes 4 and 5 can be ignored.

It is thus possible to detect and to measure very minute changes in the length of rod 1, in the order of two microns or less. The apparatus may be calibrated by initially using a rod 1 of known length, and made of a material of known linear coefficient of expansion. The maximum value of the ionization current is very small, in the order of 30 microamperes.

It is thus possible to detect very minute changes in temperature, if the apparatus is used for this purpose, because a variation in the height of the gap G, of two microns or even less will produce a change in the space current of the triode. By providing the amplifying system with a plurality of stages, the modulated amplified current can be used to operate or to control devices of various types.

If the rod 1 is made of ferro-magnetic material, it can be subjected to a constant or varying magnetic field, in order to change the length of said rod. The change in dimension of a piezo crystal under the influence of an electrostatic field can also be measured.

The test body 1 may be made of a plurality of strips of different coefficients of linear expansion, such as the well-known bi-metallic strips which are used in thermostats. Said body 1 may be any other temperature-sensitive body such as a liquid or gas-filled bellows, of the type used in thermostats. The amplifier may be of the type which has zero current when the ionization current is zero, so that when the test-body 1 reaches a selected temperature, the ionization current will start and the current flow through the tube 7 will start.

In order to detect and amplify the ionization current, I can use a gas-filled tube, such as the thyratron, whose grid is maintained at a negative bias, so that such tube has zero current, until its grid is raised to the discharge bias by the ionization current.

Fig. 2 shows the simplest form of relaxation oscillator without limiting the invention to any particular type of relaxation oscillator. The variable resistance of the gap can be used to control any type of oscillator. In Fig. 2, the rod 1 is directly immersed in the dielectric so that said rod 1 is one of the electrodes of the gap. I can use the electrode 4 of Fig. 1 in the embodiment of Fig. 2. The wire 5a is connected to one of the electrodes of a glow tube 30. The other terminal of the battery 10 is connected to the other electrode of said glow tube 30. The usual capacitance or condenser 31 is connected in shunt to the electrodes of the glow tube 30.

This type of glow tube relaxation oscillator is described on page 407 of "Theory and Applications of Electrode Tubes," by Reich, published in 1939, by McGraw-Hill Book Company, Inc. In this type of oscillator, the frequency depends almost entirely upon the time which is required to charge the condenser 31 from the extinction potential of the glow tube 30, to the ignition potential of said glow tube 30. This charging period increases with the resistance. In this circuit, substantially the entire resistance is that of the gap G. As previously stated, the resistance in the gap G can be substantially 1000 megohms. It is well known that the various types of relaxation oscillators can be locked into step with a frequency which bears various relations to the oscillation frequency of said relaxation oscillator, and I can use these well-known circuits.

I thus control the frequency of oscillation by means of the variable resistance of the gap G, in a very sensitive and reliable manner.

While the ionization range in the dielectric of alpha particles which are emitted from radium under the standard conditions above mentioned, may be as high as 60 microns, I prefer to use a dielectric in which the ionization range is maximum of 50 microns.

I have described preferred embodiments of my invention, but it is clear that numerous changes and omissions and additions can be made without departing from its scope.

I claim:

1. A method of detecting a change in dimension of a test body, which consists in regulating the length of a gap between said test body and a companion electrode by said change in dimension, said gap being filled with an ionizable and yieldable and non-gaseous dielectric ionizing, said ionizable dielectric in said gap within a selected ionization range to make said dielectric in said gap conductive when its maximum length equals said ionization range, while applying a difference in voltage between said test body and said companion electrode through said dielectric in said gap to pass an ionization current through said dielectric in said gap when said dielectric is ionized, said dielectric being substantially non-conductive when it is non-ionized.

2. A method of detecting a change in dimension of a test body, which consists in regulating the length of a gap between said test body and a companion electrode by said change in dimension, said gap being filled with an ionizable and yieldable and non-gaseous dielectric, ionizing said ionizable dielectric in said gap by alpha particles within a selected ionization range to make said dielectric in said gap conductive when its maximum length equals said ionization range, while applying a difference in voltage between said test body and said companion electrode through said dielectric in said gap to pass an ionization current through said dielectric in said gap when said dielectric is ionized, said dielectric being a liquid, the ionization range in said liquid of alpha partcles which are emitted from radium, at a pressure of 760 mm. of mercury at 15° C., being substantially 60 microns, said dielectric being substantially non-conductive when it is non-ionized.

3. Apparatus comprising a yieldable and ionizable dielectric in which the maximum ionizing range of alpha particles which are emitted from radium is substantially 60 microns at 760 mm. pressure at 15° C., spaced electrodes which have a gap between them, said gap being filled with said dielectric, a source of electric current, said source being connectbed to said electrodes to pass an ionization current through said dielectric in said gap when said dielectric in said gap is ionized, a source of alpha particles located to ionize said dielectric in said gap at a selected intensity, the maximum ionizing range of said alpha particles in said dielectric being substantally 60 microns at said pressure and said temperature, and a body which is subject to change in dimension, said body being connected to one of said electrodes to vary the length of said gap when the dimension of said body is changed.

4. Apparatus according to claim 3, in which said dielectric is a liquid.

MARIETTA BLAU.

REFERENCES CITED

The following references are of record in the file of this patent:

UNITED STATES PATENTS

| Number | Name | Date |
|---|---|---|
| 1,379,166 | Case | May 24, 1921 |
| 1,686,365 | Becker | Oct. 2, 1928 |
| 2,122,222 | Vingerhoets | June 28, 1938 |